United States Patent [19]

Hamane et al.

[11] 4,388,952
[45] Jun. 21, 1983

[54] COIL WINDING APPARATUS

[75] Inventors: Takuhito Hamane, Hirakata; Toshio Kinoshita, Katano; Masafumi Kihira, Hyogo, all of Japan

[73] Assignee: Matsushita Electric Industrial Co., Ltd., Osaka, Japan

[21] Appl. No.: 225,247

[22] Filed: Jan. 15, 1981

[51] Int. Cl.³ .................... H02K 15/08; B65H 81/00
[52] U.S. Cl. .................... 140/92.1; 242/7.14; 242/37 R
[58] Field of Search ............ 242/7.14, 7.11, 7.05 B, 242/82, 83, 29, 37 R, 25; 140/92.1; 29/605, 595

[56] References Cited

U.S. PATENT DOCUMENTS

| 3,191,638 | 6/1965 | Shmoolevich et al. | 140/92.1 |
| 3,599,891 | 8/1971 | Stone | 242/82 |
| 3,791,419 | 2/1974 | Arick et al. | 140/92.1 |
| 3,995,785 | 12/1976 | Arick et al. | 140/92.1 |
| 4,109,879 | 8/1978 | Properzi | 242/83 |

Primary Examiner—Billy S. Taylor
Attorney, Agent, or Firm—Birch, Stewart, Kolasch & Birch

[57] ABSTRACT

A coil winding apparatus comprising a spool, a flyer for effecting relative revolution around the spool to wind the wire around the spool, a continuous wire passage for guiding the wire to the flyer, a bobbin with the wire wound therearound, and a feeding means for compulsorily feeding the wire, wound around the bobbin, to the flyer through the wire passage, the continuous wire passage through which the wire is extended to form the coil allowing the wire to be automatically fed into the wire passage, whereby the time required for the wire inserting operation to be effected during the replacement of the wire can be considerably shortened.

8 Claims, 10 Drawing Figures

COIL WINDING APPARATUS

BACKGROUND OF THE INVENTION

The present invention relates to a coil winding apparatus and, more particularly, to an apparatus for manufacturing coils of wire for use as stators of electric machines.

Conventionally, in coil winding apparatus, the wire passage through which the wire for forming the coil was inserted by a manual operation and was not continuous. Also, the bobbins each having the wire wound therearound were fed through a manual operation, and thus a lot of time was required for the wire to be inserted into the wire passage during the replacement of the bobbins.

The present invention was developed for the purpose of eliminating the above problems encountered in conjunction with the conventional coil winding apparatus.

SUMMARY OF THE INVENTION

Accordingly, the object of the present invention is to provide a coil winding apparatus which can eliminate the disadvantages inherent to the conventional coil winding apparatus, and wherein a wire for forming the coil is automatically fed to the tip end of a flyer to shorten the time required for the wire to be inserted into the wire passage during the replacement of the electric wire.

Another object of the present invention is to provide a coil winding apparatus comprising a spool, a flyer for effecting relative revolution around the spool to wind the wire around the spool, a continuous wire passage for guiding the wire to the flyer, a bobbin with the wire wound therearound and a feeding means for compulsorily feeding the wire, wound around the bobbin, to the flyer through the wire passage, the continuous wire passage through which the wire is extended to form the coil allowing the wire to be automatically fed into the wire passage, whereby the time required for the wire inserting operation to be effected during the replacement of the wire can be considerably shortened.

According to the present invention, there is provided a coil winding apparatus which comprises a spool, a flyer for effecting relative revolution around the spool to wind the wire around the spool, a continuous wire passage for guiding the wire to the flyer, a bobbin with the wire wound therearound, a switch means for detecting the existence of the wire from the bobbin, a feeding means for compulsorily driving the wire taken out from the bobbin to feed the wire toward said flyer through said wire passage, a clutch means for controlling the driving operation of said feeding means, and a bobbin means for feeding the bobbin, with the wire wound therearound, downwardly under said feeding means and positioning the top end portion of the wire of the bobbin, into the feeding means, said switch means controlling the operations of the feeding means, clutch means and bobbin means.

BRIEF DESCRIPTION OF THE DRAWINGS

These and other objects, features, aspects and advantages of the present invention will become more apparent from the following detailed description of the preferred embodiment when taken in conjunction with the accompanying drawings in which.

Before the description of the present invention proceeds, it is to be noted that like parts are designated by like reference numerals throughout the accompanying drawings.

DETAILED DESCRIPTION OF THE PREFERRED EMBODIMENT

Figure 1:
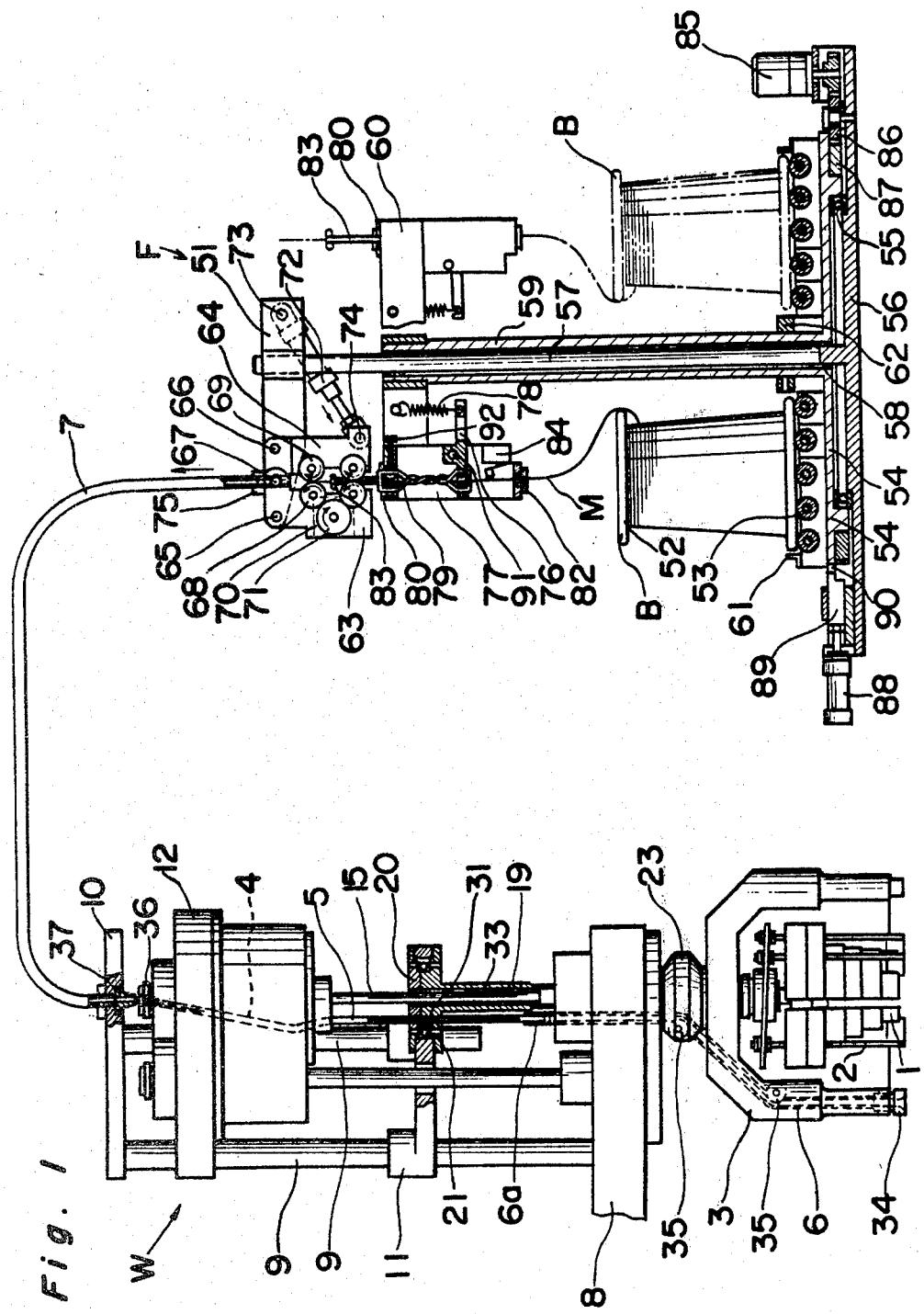
FIG. 1 is a front view, partially cross-sectioned and broken away, of a coil winding apparatus including a coil winding unit and a coil feeding unit in one embodiment of the present invention.

Referring to FIG. 1, there is shown a coil winding apparatus consisting of a coil winding unit W and a coil feeding unit F disposed at the left side and the right side of the drawing respectively. The coil winding unit W is operated to make a coil winding with a wire M of metal being supplied from the coil feeding unit F, and includes a winding former or spool 1 for winding a wire M thereon to form a coil C (see FIG. 2), a push rod 2 for drawing out the coil C from the spool 1, a flyer 3 to be rotated by a driving means to wind a wire M around the spool 1, a guide means including guide pipes 4, 5, 6 and a guide tube 7 for guiding a wire being supplied from the coil feeding unit F to the flyer 3, and a holding means, not shown in the drawings, for holding the free end of wire onto the spool 1 so as to be able to wind the wire M therearound. The coil feeding unit F is operated to supply in succession the wire wound around bobbin B into the guide means of the coil winding unit W, and includes a bobbin means for regulating the position of the bobbin B so as to effectively remove the wire M therefrom, a switch means for detecting the existence of the wire M being supplied from the bobbin B, a feed means for feeding forcibly the wire M from the bobbin B to the coil winding unit W being driven through a driving motor which is actuated by the switch means, a clutch means for shifting the feed means between one position at which the wire M is able to be engaged with the feed means and the other position at which the wire M is impossible to be engaged therewith, and a tension means for adjusting the tension force of the wire M being supplied from the bobbin B to the feed means.

Figure 2:
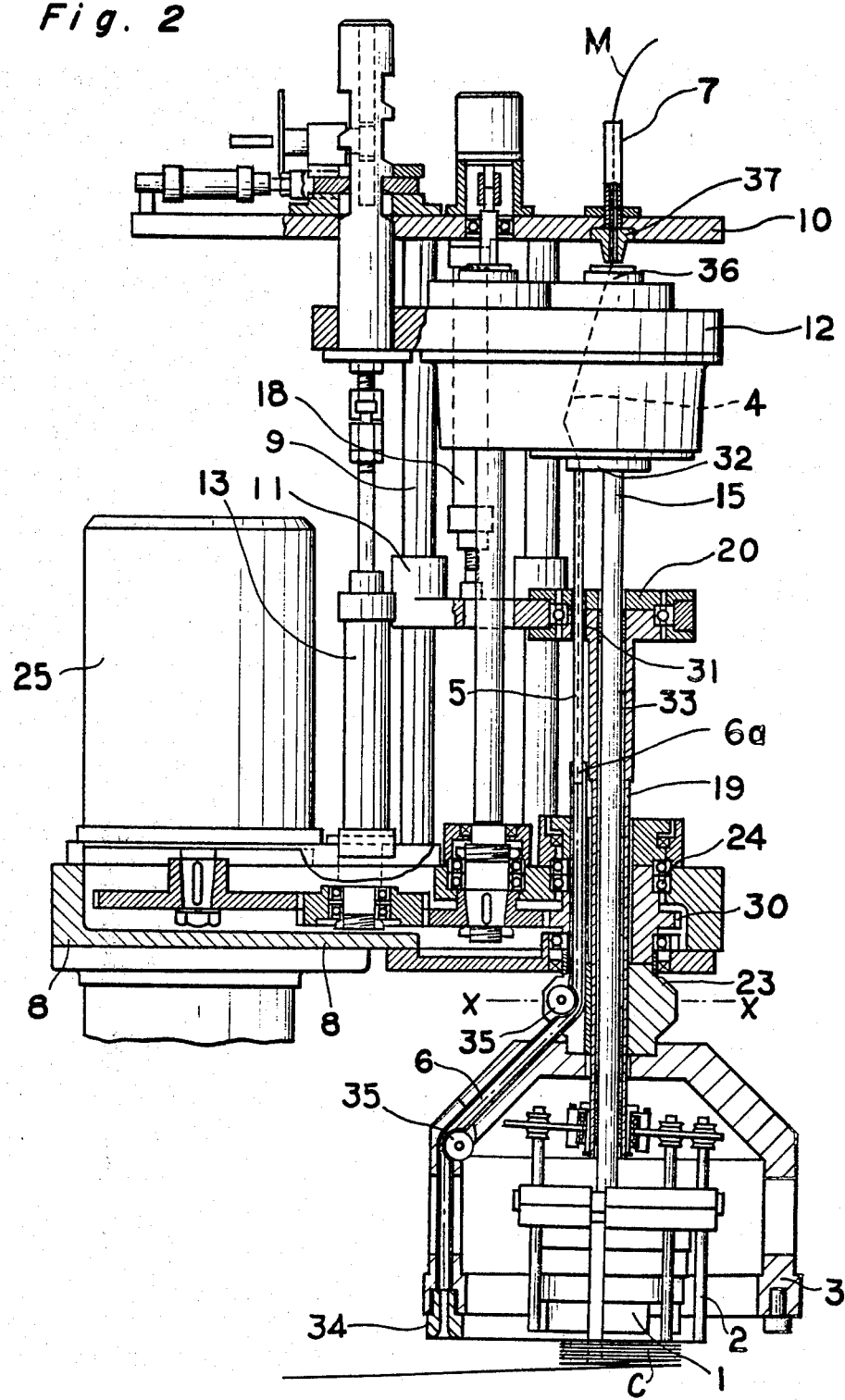
FIG. 2 is a cross-sectional view, on an enlarged scale, of an essential portion of the coil winding unit in FIG. 1.
Figure 3:
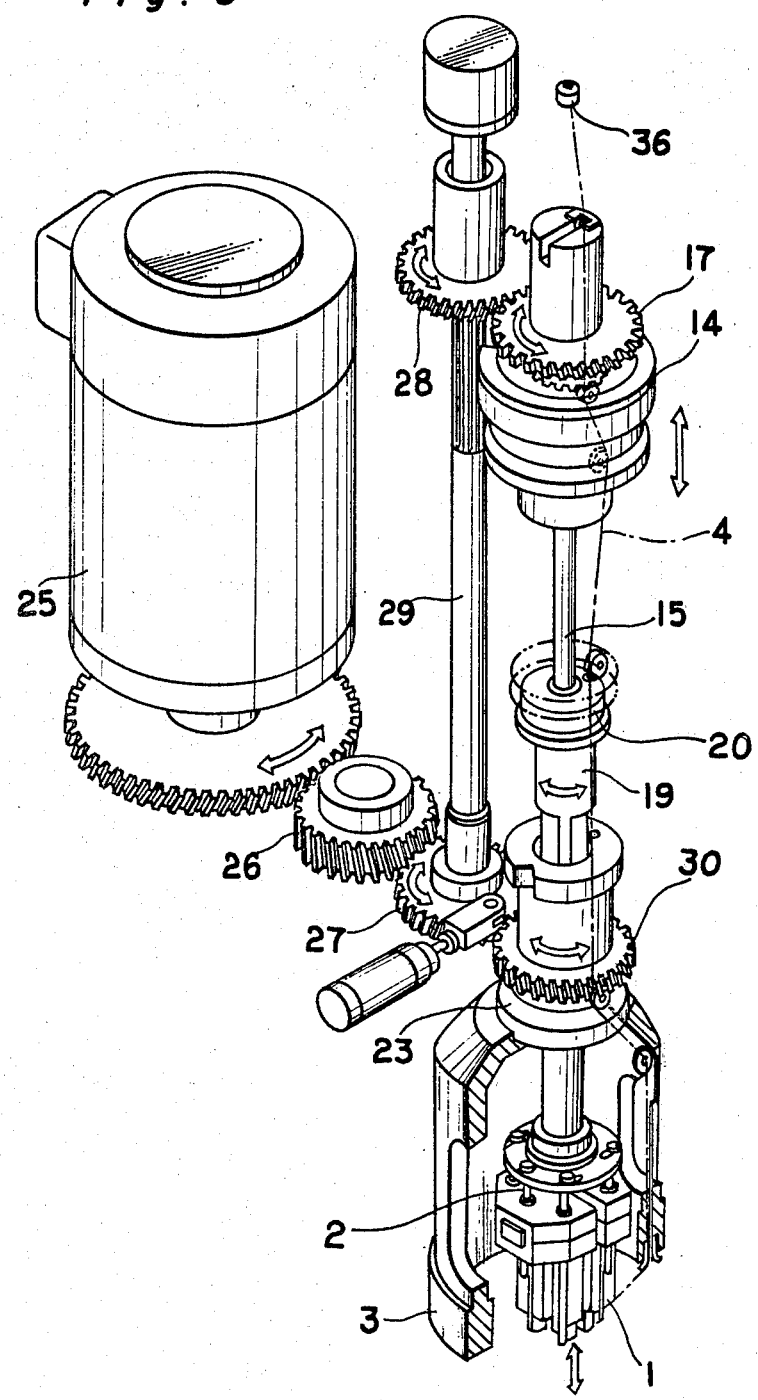
FIG. 3 is a perspective view showing the parts comprising the portion of the coil winding unit in FIG. 2.
Figure 4:
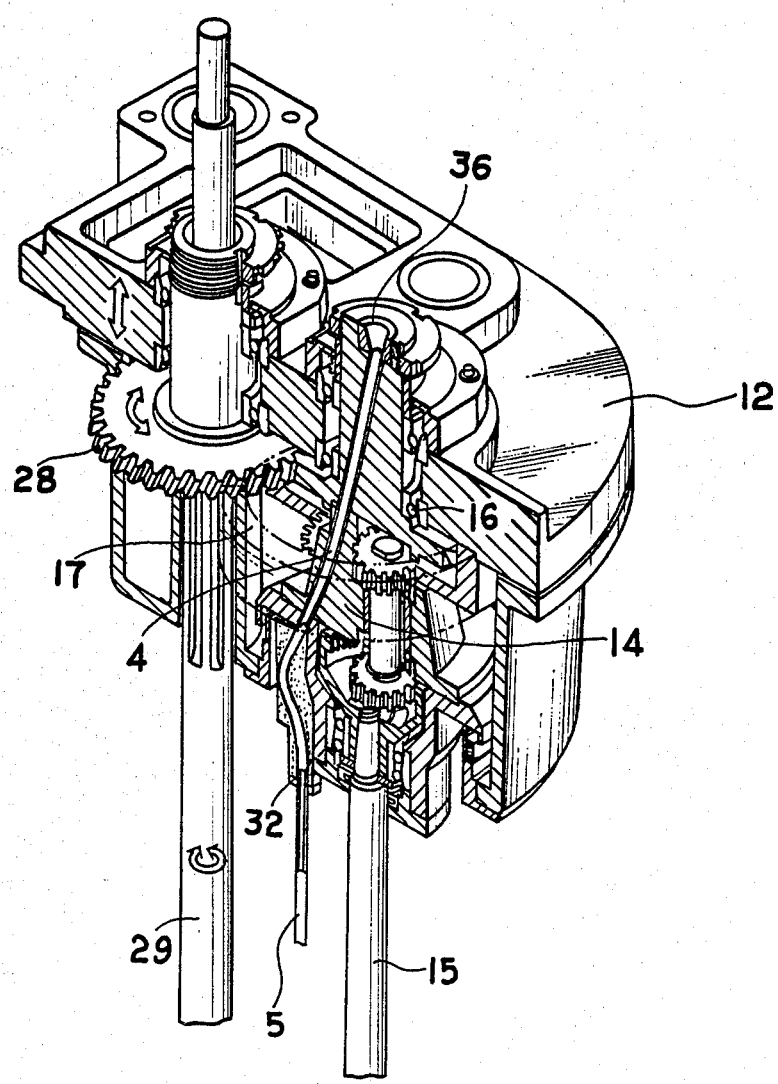
FIG. 4 is a perspective view, on an enlarged scale in cross-section, of one portion of FIG. 2.
Figure 5:
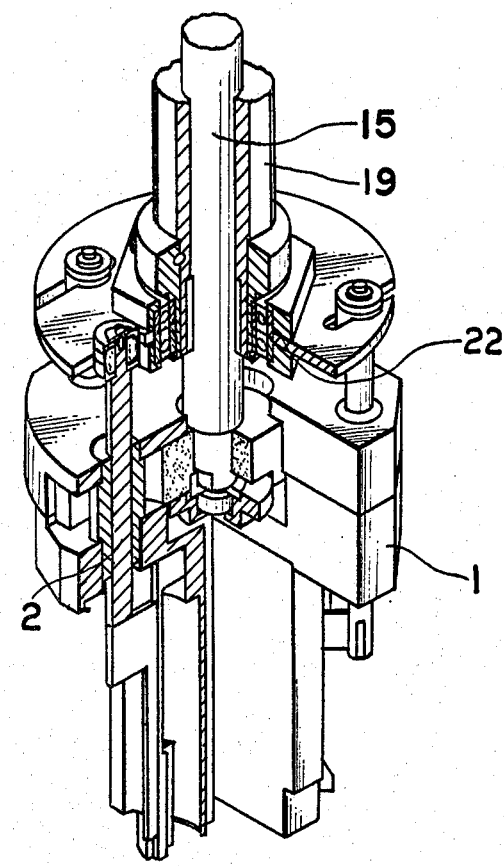
FIG. 5 is a perspective view, on an enlarged scale in cross-section, of the other portion of FIG. 2.
Figure 6:
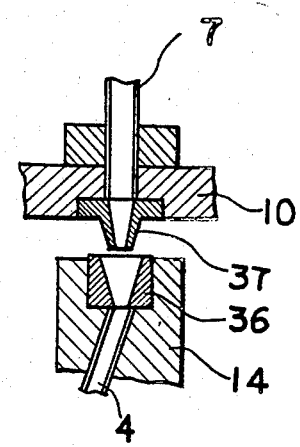
FIG. 6 is a cross-sectional view, on an enlarged scale, of a portion of FIG. 2.
Figure 7:
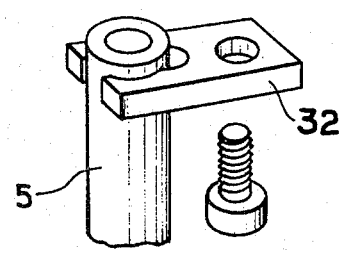
FIG. 7 is a perspective view, on an enlarged scale, of a portion of FIG. 2.
Figure 8:
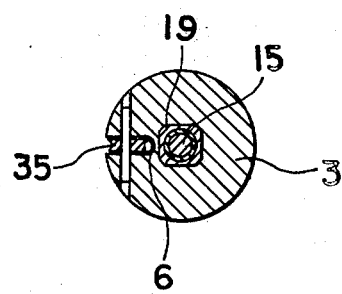
FIG. 8 is a cross-sectional view, taken along the line X—X, of a portion of FIG. 2.

The detailed construction of the coil winding unit will be described hereinbelow in conjunction with FIGS. 2 to 6. In FIG. 2, a housing 8 for accommodating the driving means therein is fixedly provided on the foundation of the apparatus as to form a base plate for mounting all the parts of the coil winding unit W thereon. At least more than two slide shafts 9, 9 are vertically provided on the base plate 8 in parallel to each other and are provided with a connecting plate 10 at the top ends thereof, and also a sliding plate 11 and a gear box 12 are provided slidably therealong in the vertical direction, respectively. Above the sliding plate 11, the gear box 12 is moved incremetally along the slide shafts 9 by a cylinder 13 of cam type which is positioned initially at the upper position thereof for supplying the wire M to the flyer 3 at first and then is moved to the lower positions being desirable for winding the wire M onto the spool 1 continuously, and provides a rotary body 14 (see FIGS. 3, 4) for supporting the first guide pipe 4 made of resin therein and a support shaft 15 extending downwardly therefrom to support the spool 1 at the end thereof. The rotary body 14 is rotatably provided within the gear box 12 through a bearing 16 which provides a gear 17 as shown by imaginary lines in FIG. 4 and the first guide pipe 4 is passed through the rotary body 14 in order to guide the wire M therethrough, as shown in FIG. 4. The sliding plate 11 is also moved up and down along the slide shaft 9 together with the push rod 2 by a plunger 18 of piston type between the top position, in which the push rod 2 is drawn so as to be positioned apart from the coil C wound upon the spool 1, and the bottom position, in which the push rod 2 is projected to push out and remove the coil C from the spool 1. It is to be noted that each of the push rod 2, spool 1 and holding means has respectively a standard construction of conventional type which renders the normal known operations such as sliding motions of the push rod 2 relative to the spool 1 for forming a coil C of wire M with a shape similar to the outer configuration of the spool 1 in cooperation with the rotation of the flyer 3. The push rod 2 is connected with the sliding plate 11 through a shaft 19 of a polygonal section which is provided at one end thereof with a flange portion 20 supported on the free end of the sliding plate 11 through a bearing 21 and the other end of which is rotatably connected to the push rod 2 through a bearing 22 as shown in FIG. 5. The polygon shaft 19 is slidably inserted into and rotated with a collar bearing 23 which is provided so as to be rotated together with the flyer 3 through a bearing 24 disposed in the housing 8. The driving means comprises, as shown in FIG. 3, a motor 25 and a gears train 26 including twin gears 27, 28 of a spline shaft 29 for driving a counterpart gear 30 which is provided on a shaft portion of the collar bearing 23 so as to rotate the rotary body 14. The rotary body 14 is rotated in synchronization with the bearing 23 of the flyer 3 when the rotary body 14 is connected to the collar bearing 24 by a flange portion 20 of the polygon shaft 19. The flange portion 20 of the polygon shaft 19 provides a through hole 31 to receive slidably therein a second guide pipe 5 of metal of which the top end is supported by a support plate 32 of the rotary body 14 so as to connect with the first guide pipe 4 to guide the wire M, as shown in FIG. 7. The flyer 3 is formed of a cap shape to cover the spool 1 and push rod 2 therein and is fixedly mounted on the collar bearing 23 through which is provided with a third guide pipe 6 of resin to be connected slidably with the lower end of the second guide pipe 5 at the upper opening 6a thereof. The support shaft 15 is slidably provided passing through a center hole 33 provided in the polygon shaft 19 and is connected at the both ends with the gear box 12 and spool 1 so as to move them as a unit along the polygon shaft 19. At the bottom end of the flyer 3, an exhaust nozzle 34 is provided for guiding the wire M toward the spool 1 from the third guide pipe 6 passing through the collar bearing 23 and flyer 3, at each bent portion of the guide pipe 6 at least more than one roller 35 is provided projecting into the third guide pipe 6 so as to guide the wire M running smoothly along the bent portions of the third guide pipe 6, as shown with FIG. 8. Since the lower end of the second guide pipe 5 is slidably inserted into the upper opening 6a of the third guide pipe 6, the second guide pipe 5 is able to move in accordance with the sliding movement of the rotary body 14 together with the guide box 12. At the top end of the rotary body 14 a receiving nozzle 36 is provided along the axis of the support shaft 15 for receiving the wire M which is supplied from a supplying nozzle 37 provided on the connecting plate 10 into the first guide pipe 4 of the rotary body 14. Three of the first, second and third guide pipes 4, 5, 6 are rotated as one unit in accordance with the synchronizing rotation of the rotary body 14, polygon shaft 19, collar bearing 23 and flyer 3 to guide the wire M from the receiving nozzle 36 to the exhaust nozzle 34 therethrough in such a manner that the exhaust nozzle 34 is rotated around the spool 1 together with the flyer 3 regardless of the sliding movements between the rotary body 14 of the gear box 12 and the flange portion 20 of the polygon shaft 19. The supplying nozzle 37 is provided projecting from the lower plane of the connecting plate 10 to supply the wire M toward the receiving nozzle 36 of the rotary body 14 as shown in FIG. 6, and is connected with the guide tube 7 of resin provided between the connecting plate 10 and a support plate 51 for supporting the roller means of the coil feeding unit F.

With the above construction of the coil winding apparatus, at first the wire M is automatically supplied from the supplying nozzle 37 of the guide tube 7 to the receiving nozzle 36 of the guide pipes 4, 5, 6 and to the exhaust nozzle 34 of the flyer 3 therethrough when the gear box 12 and the sliding plate 11 are respectively stayed at the upper position and top position, then the wire M running out from the exhaust nozzle 34 of the flyer 3 is wound around the spool 1 to form a coil C while the spool 1 is moved downwardly to the lower position thereof by the support shaft 15 of the gear box 12 to shift gradually the portion of the spool 1 onto which the wire M is wound. The coil C having been formed on the spool 1 is finally pushed off from the spool 1 by pushing of the push rod 2 when the push rod 2 is moved downwardly to the bottom position of the polygon shaft 19 of the sliding plate 11. These steps are repeated in cycle to obtain coils of wire.

Figure 9:
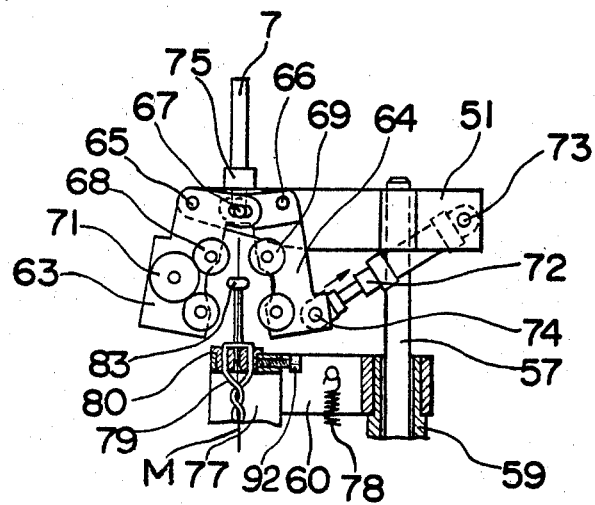
FIG. 9 is a front view, on an enlarged scale, of a portion of the coil feeding unit in FIG. 1.
Figure 10:
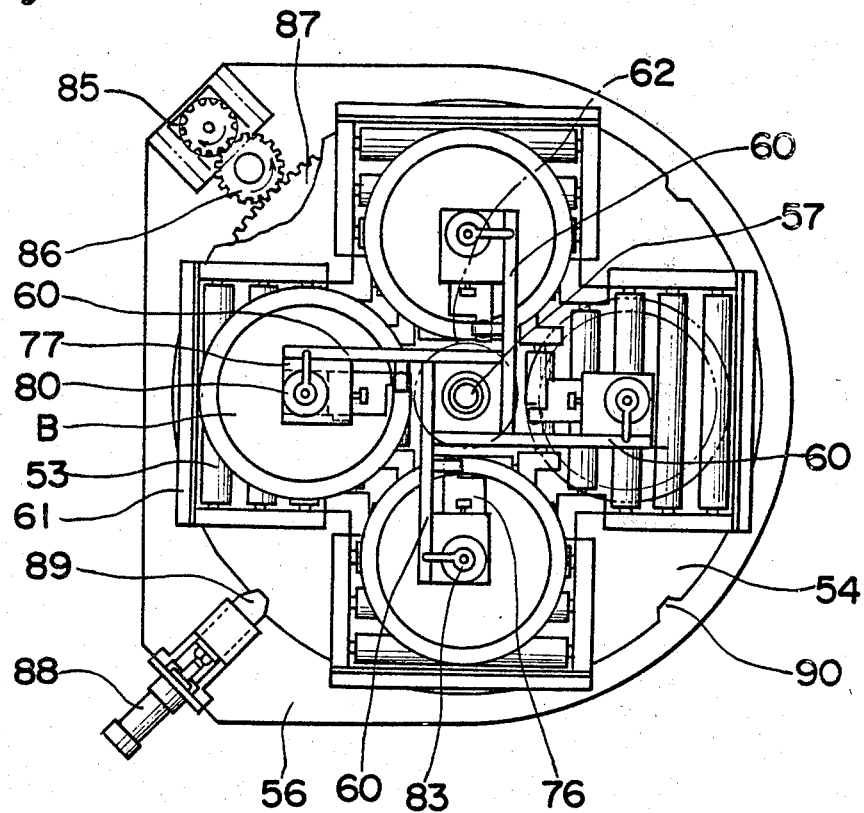
FIG. 10 is a plan view, partially broken away, of the coil feeding unit in FIG. 1.

Referring now to FIGS. 1, 9 and 10, the construction of the coil feeding unit F will be described in detail hereinafter.

A bobbin B of wire M, for instance, electric metal wire wound around the core 52 is put on a roller conveyor 53 provided on a rotary disc 54 which is supported rotatably by a thrust bearing 55 being mounted on a base plate 56 having a bobbin means and a support pole 57 for supporting the support 51 of the feed means F at the top end thereof. The support pole 57 is set up at the center of the base plate 56 to pass through a center hole 58 of a hollow post 59 projecting from the center of the rotary disc 54 upwardly which supports arms 60 at the top end thereof. On the rotary disc 54 there are provided around the hollow post 59 four set of conveyors 53 each having a row of rollers and, a stop plate 61 and a stop ring 62 each provided at the side of the rollers 53 for preventing the bobbin B, which is supplied automatically on the rollers, from coming off from the rollers 53. The counterpart of the support arms 60 each having the switch means and tension means is provided above the bobbin B being put on the rollers 53 so as to receive the wire from the bobbin B to the tension means, while the support plate 51 having the feed means and clutch means is provided above one of the support arms 60 so as to receive the wire M from the tension means to the feed means F which is actuated by the clutch means to feed the wire M into the guide tube 7 connected between the support plate 51 and the connecting plate 10 of the coil winding apparatus W.

The feed means includes, as shown in FIG. 9, a pair of levers 63, 64 each supported pivotably and symmetrically to the wire M by a pin 65, 66 on the support plate 51 so as to form a shears, a coupling pin 67 for interlocking the pair of levers 63, 64 by connecting therewith both slots provided at each elongaged portion of each of the levers 63, 64, two sets of pairs of driving and driven rollers 68, 69 each pair supported on levers 63, 64 respectively so as to be able to put the wire M therebetween, and a driving motor 70 having a main roller 71 for rotating the driving rollers 68 under the actuation of the switch means for detecting the existance of the wire M being supplied from the bobbin B to the feed means. The driving rollers 68 provided on the one lever 63 are driven by the main roller 71 mounted to the driving motor 70 to drive the driven rollers 69 provided on the other lever 64 when the levers 63, 64 are moved by the clutch means to the engaging position for putting the wire M between the pair of rollers 68, 69. The clutch means includes a cylinder 72 provided and pivotably supported on the support plate 51 by a pin 73 and a free end of the plunger thereof is connected to said other lever 64 of the feed means by a pin 73. Said cylinder 72, when operated to push said plunger out, causes the levers 63, 64 to close on each other for putting the wire M therebetween as shown in FIG. 1, and, when operated to pull said plunger thereinto, causes the levers 63, 64 to open for releasing the wire M as shown in FIG. 9. One end portion of the guide tube 7 is secured by a cap plate 75 and inserted therethrough which is mounted in alignment with a through hole thereof provided along a symmetric line with the pair of rollers 68, 69 so that the one end of the guide tube 7 is opened toward the center of the rollers 68, 69 of the feed means.

The tension means is constructed in a structure of known type including a tension lever 76 pivotally supported by a pin 91 on a hand plate 77 of the support arm 60 and forcibly urged by a spring 78 for pulling a tension yarn 79 against a rotary nozzle 80 which is rotatably together with the tension yarn 79 to adjust the tension force of the wire M passing through the tension yarn 79. The spring 78 is provided between the tension lever 76 and the support arm 60, and the tension yarn 79 is provided between the tension lever 76 and the rotary nozzle 80 so as to pass the wire M therethrough. The rotary nozzle 80 is provided rotatably on the top end of the hand plate 77 for twisting the tension yarn 79 together with the wire M. A bolt 92 is provided for securing the rotary nozzle 80 at the desired position, and a fixed nozzle 82 is provided at the bottom end of the hand plate 77 in order to guide the wire M from the bobbin B to the tension yarn 79 and rotary nozzle 80. Above the rotary nozzle 80 and on the top end of the hand plate 77 there is provided a retaining ring 83 for passing the wire M therethrough and for holding tentatively the end of wire M in order to guide it exactly along the centerline between the rollers 68, 69 of the feed means.

The switch means is provided on the hand plate 77 between the fixed nozzle 82 and tension lever 76 in such a way that an actuator 84 thereof is positioned onto the passage of the wire M being supplied from the bobbin B to the feed means. The switch means controls the operation of the cylinder 72 of the clutch means in such a manner that, when the actuator 84 is actuated by the wire M positioned between the rollers 68, 69 of the feeding means, the cylinder 72 of the clutch means is actuated to move the levers 63, 64 of the rollers 68, 69 into the engaging position, while, when the actuator 84 doesn't detect the wire M, the cylinder 72 is actuated to move the levers 63, 64 of the rollers 68, 69 into the disengaging position.

The bobbin means includes a driving means for rotating the rotary disc 54 with the hollow post 59 around the support pole 57 of the base plate 56 which supports the thrust bearing 55. The driving means includes a motor 85 for driving a driving gear 86 provided on the base plate 56 which meshes with a driven gear 87 provided under the lower plane of the rotary disc 54 and a cylinder 88 being provided on the base plate 56 for actuating a rod 89 being adapted to engage with one of four recesses 90 which are provided on the periphery of the rotary disc 54 in corresponding with the conveyors 53 in order to lock the rotary disc 54 at the predetermined position where one of the bobbins B is positioned under the tension means to facilitate supplying of the wire M into the feed means. The motor 85 and cylinder 88 of the bobbin means is operated by the switch means in such a manner that, when the actuator 84 of the switch means doesn't detect the wire M, the cylinder 88 is operated to unlock the rod 89 from one of the recesses 90 of the rotary disc 54 and the motor 85 is driven to rotate the rotary disc 54 through driving of the driving gear 86 and driven gear 87 until the rod 89 which is biased to the projected position by a spring (not shown) and is engaged again with the next recess 90 of the rotary disc 54, and, when the actuator 84 is detecting the wire M, the cylinder 88 is operated to project the rod 89 into the recess 90 of the rotary disc 54 and the motor 85 is stopped.

In the above-described construction of the coil winding apparatus, as the remaining amount of the wire M wound around the bobbin B runs short during the wire winding operation, the switch means detects non-existence of the wire M and operates to bring the coil winding apparatus to a steady stop. During the steady stop state of the coil winding apparatus, the nozzles 34, 36, 37, rollers 35, guide pipes 4, 5, 6 and guide tube 7 are set to form a continuous wire passage of the coil winding unit W. Continuously, the rod 89 of the bobbin means in the coil feeding unit F is unlocked from the recess 90 of the rotary disc 54 by the cylinder 88 and the driving motor 85 rotates the driving gear 86 to rotate the rotary disc 54 in one direction around the support pole 57 through the engaging gear 87 of the rotary disc 54. Four roller conveyors 53 are provided on the upper surface of the rotary disc 54, and the bobbin B with the wire M being wound therearound is provided on each of the conveyor 53. The end portion of the wire M wound up around the bobbin B is inserted into the guide holes being provided in the order of the fixed nozzle 82, tension lever 76 and the rotary nozzle 80, and is retained, by the retaining ring 83, in such a way that the end of the wire M is slightly projected from the retaining ring 83. Also, the wire M is given a predetermined tension by twisting the tension yarn 79 through rotation of the rotary nozzle 80. The tension means are provided corresponding to each of the roller conveyors 53 and are rotated together with the roller conveyors 53 according to the rotation of the rotary disc 54. When the new bobbin B is positioned under the rollers 68, 69 of the feed means, the projecting rod 89 of the bobbin means is engaged with the next recess 90 of the rotary disc 54 to lock the rotary disc for maintaining the bobbin B under the rollers 68, 69. The cylinder 72 of the feed means normally is contracted to its retreat position as shown in FIG. 9 and retains the levers 63, 64 opened with respect to each other. As the rotary disc 54 rotates to feed the bobbin B and the end portion of the wire M, which is retained by the retaining ring 83, is fed to a space between the lever 63 and the lever 64, the cylinder 72 is actuated to close the levers 63, 64, as shown in FIG. 1, so as to insert the end portion of the wire M between the rollers 68, 69. The lever 63 is pivotably coupled to the lever 64 by the coupling pin 67, and is adapted to open or close symmetrically to and cooperatively with the other lever 64 which is actuated directly by the cylinder 72. When the end portion of the wire M is inserted between the rollers 68, 69, the driving motor 70 is started to rotate the driving roller 68. The roller 69, which comes into circumscribed contact against the driving roller 68, is rotated in the direction of an arrow to feed the end portion of the wire M into the continuous wire passage of the guide tube 7 in the direction of an arrow for winding operation within the coil winding unit W. When the wire M is inserted into the feed means until the end thereof projects from the exhaust nozzle 34 of the flyer 3 and it becomes possible for the wire M to be fed continuously into and passing through the wire passage of the guide means, the driving motor 70 comes to a stop and the cylinder 72 retreats to retain the levers 63, 64 in the opened condition. The bobbin, when the wire has been exhausted therefrom, is replaced by a new bobbin, as mentioned above, which is brought from the roller conveyor 53 without causing a stop of the coil winding apparatus during the coil winding operation.

In the above-described embodiment of the coil feeding unit, a revolution bobbin means by the rotary disc is used to automatically feed a new bobbin to a position under the rollers of the feed means. However, any bobbing means such as the rectilinear feeding type for automatically feeding in the line direction of the bobbin with the wire wound therearound downwardly under the roller of the feed means may be employed in place of the rotary disc.

According to the present invention, the continuous wire passage of the guide means through which the wire is extended to form the coil allows the wire to be automatically fed from the feed means into the wire passage of the flyer, whereby the time required for the wire inserting operation to be effected during the replacement of the wire can be considerably shortened, the operation of inserting the wire can be effected without manual aid and the operational cost of the coil winding apparatus can be considerably reduced.

Although this invention has been described and illustrated in detail, it is to be clearly understood that the same is by way of illustration and example only and is not to be taken by way of limitation the spirit and scope of this invention being limited only by the terms of the appended claims.

What is claimed is:

1. A coil winding apparatus comprising:
   spool means for winding a wire therearound;
   flyer means for effecting relative revolution around the spool means to wind the wire around said spool means;
   continuous wire passage means for guiding the wire to the flyer means so as to feed the wire to said flyer means;
   wire feeding means including a pair of rollers disposed at a starting end of said wire passage means to hold the wire in a radial direction and driving means operatively connected to said rollers for axially moving the wire through rotation of said rollers so as to drive the wire along said wire passage means;
   opening and closing means for displacing said rollers approximately in the radial direction to control a state of contact therebetween with the wire;
   a plurality of bobbins around which the wire is wound;
   wire holding means for holding the end of the wire wound around said bobbin in such a manner to permit axial movement thereof;
   detection switch means for detecting presence or absence of the wire reaching the holding means; and
   bobbin feeding means for positioning the bobbin under said wire feeding means in response to a signal from said detection switch means.

2. A coil winding apparatus according to claim 1, wherein said bobbin feeding means includes a drive motor for rotating said plurality of bobbins to automatically supply a full bobbin to said wire feeding means and a locking means for fixing the position of said full bobbin relative to said wire feeding means.

3. A coil winding apparatus according to claim 2, wherein said locking means includes a cylinder actuated to engage a recess in a rotary disc on which the plurality of bobbins are positioned.

4. A coil winding apparatus according to claim 1, wherein said wire holding means includes a tension yarn for placing a tension on the wire withdrawn from the bobbin.

5. A coil winding apparatus according to claim 1, wherein said pair of rollers are individually mounted on a pair of levers, respectively, said levers being coupled together by a coupling pin and operatively connected to a cylinder to open and close said levers to engage and disengage said wire in response to a signal from said detection means.

6. A coil winding apparatus comprising:
   coil winding means including an entrance means for receiving a wire to be wound into a coil;
   spool means for forming a coil therearound;
   flyer means including a rotational axis for winding the wire received around said spool means onto the coil and removing means for removing the coil from said spool means when the coil has been formed;
   said flyer means being supported by a bearing means having a gear which is driven through a gear train by a motor, wherein one gear of said gear train is supported by a rotatable shaft and said rotatable shaft includes another gear having the same radius and mesh as said one gear of said gear train;
   wire feeding means for feeding the wire from a bobbin for supplying the wire to the coil winding means and being provided with an exit means through which the wire is discharged;

guide tube means for guiding the wire from the exit means of the wire feeding means to the entrance means of the coil winding means;

said entrance means being positioned substantially on an extension of the rotational axis of the flyer means and spaced apart from the flyer means and said coil winding means further including a guide means being connected between the entrance means and the flyer means for guiding the wire from the entrance means to the flyer means and a rotating means for rotating said guide means around the rotating axis of the flyer means in synchronization therewith, said rotating means of the guide means being a rotatable body including a gear which is selectively engageable to said another gear of the rotatable shaft and has the same radius and mesh as the gear of the bearing means; and said wire feeding means further including a retaining means for retaining one end of the wire at a predetermined initial position, a feeding means for forcibly feeding said end of the wire retained, through said guide tube means and guide means, to the flyer means prior to the winding operation of said coil winding means.

7. A coil winding apparatus according to claim 6, wherein at least a part of said guide means is a guide tube which is passed through said rotatable body along a line being inclined or curved to the rotational axis of the rotatable body.

8. A coil winding apparatus comprising:

coil winding means including an entrance means for receiving a wire to be wound into a coil;

spool means for forming a coil therearound;

flyer means including a rotational axis for winding the wire received around said spool means onto the coil and removing means for removing the coil from said spool means when the coil has been formed;

wire feeding means for feeding the wire from a bobbin for supplying the wire to the coil winding means and being provided with an exit means through which the wire is discharged;

guide tube means for guiding the wire from the exit means of the wire feeding means to the entrance means of the coil winding means;

said entrance means being positioned substantially on an extension of the rotational axis of the flyer means and spaced apart from the flyer means and said coil winding means further including a guide means being connected between the entrance means and the flyer means for guiding the wire from the entrance means to the flyer means and a rotating means for rotating said guide means around the rotating axis of the flyer means in synchronization therewith; and said wire feeding means further including a retaining means for retaining one end of the wire at a predetermined initial position, a feeding means for forcibly feeding said end of the wire retained, through said guide tube means and guide means, to the flyer means prior to the winding operation of said coil winding means, a switch means for detecting the existence of the wire at said predetermined position and a clutch means for controlling the operation of said feeding means according to the signal of said switch means.

* * * * *